United States Patent [19]

Shonkwiler

[11] 4,015,879
[45] Apr. 5, 1977

[54] CONVERTIBLE ADJUSTABLE TILTING BED FOR VEHICLES

[76] Inventor: Forest M. Shonkwiler, 22652 W. Madison Road, South Bend, Ind. 46614

[22] Filed: Feb. 26, 1976

[21] Appl. No.: 661,830

[52] U.S. Cl. .............................. 298/14; 296/28 D; 214/505

[51] Int. Cl.² .......................................... B60P 1/04

[58] Field of Search .......... 296/28 D; 298/1 R, 12, 298/14, 175 G, 17.5; 214/505

[56] References Cited

UNITED STATES PATENTS

| | | | |
|---|---|---|---|
| 1,705,968 | 3/1929 | Eisenhut | 298/17.5 |
| 1,902,093 | 3/1933 | Ogilvie | 298/12 |
| 3,450,282 | 6/1969 | Ezolt | 298/14 X |

Primary Examiner—Philip Goodman
Attorney, Agent, or Firm—Oltsch & Knoblock

[57] ABSTRACT

A convertible adjustable tilting bed for vehicles which is operable by power actuated means selectively to and from load-carrying and tilted dumping positions relative to a vehicle frame in one adjustment thereof and selectively to and from load carrying position and a ramp forming position at the rear of a vehicle frame in another adjustment. The adjustments entail selective application of connecting members at two longitudinally spaced positions of the vehicle frame and the bed.

5 Claims, 3 Drawing Figures

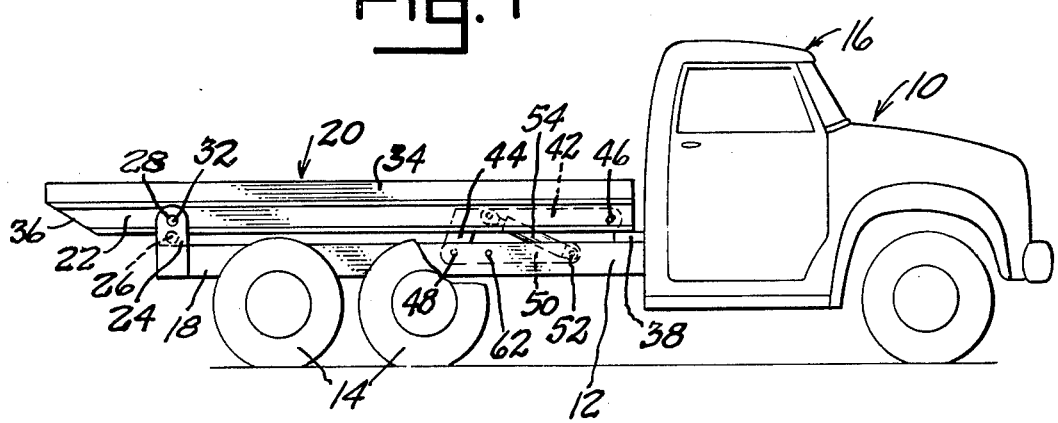
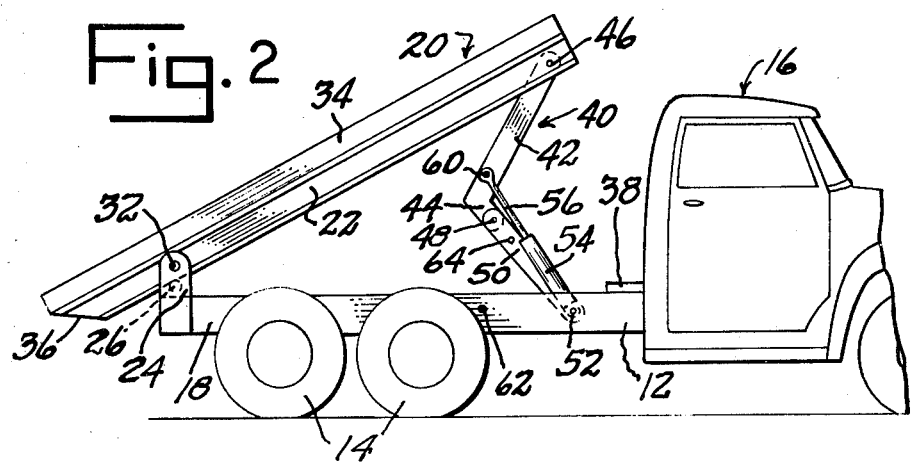
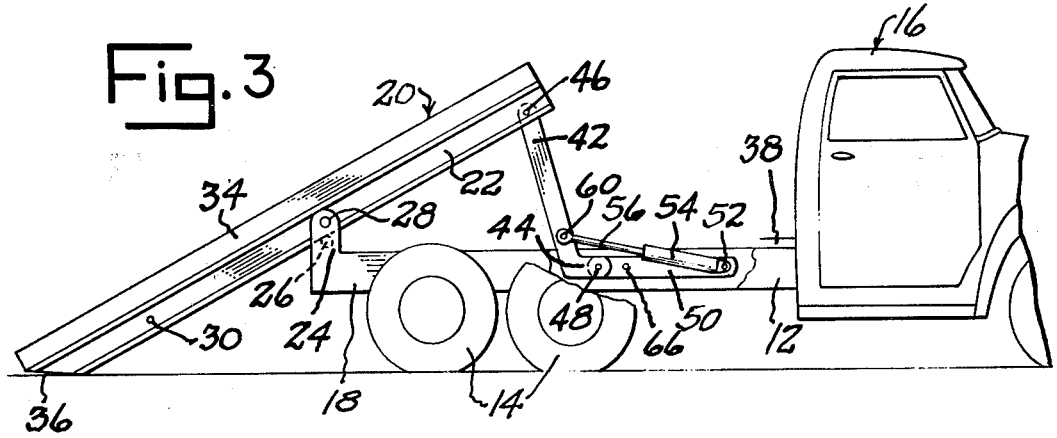

CONVERTIBLE ADJUSTABLE TILTING BED FOR VEHICLES

SUMMARY OF THE INVENTION

This invention relates to improvements in adjustable tilting beds for vehicles.

Heretofore adjustable tilting beds for vehicles have been of one of two types; namely, a dump type in which a bed is pivoted at the rear of a vehicle frame and is adapted to be elevated at its front so as to dump fluent contents of the container mounted on the bed, or a ramp forming type in which the bed may shift longitudinally on a vehicle frame between a superposed load carrying position on the frame and a rearwardly displaced position tilted on the frame with its rear end resting upon the ground to facilitate loading and unloading of the vehicle. Thus heretofore it has been necessary to have two adjustable bed vehicles of the respective types available for use as different types of operating conditions were encountered. This has entailed substantial investment, and inconvenience of locating and transferring from one vehicle to another, the need to store or garage two vehicles, travel of two vehicles between a work area and a storage point whenever a different type vehicle is required, and other limitations and resultant disadvantages.

It is the primary object of this invention to provide an adjustable tilting bed for vehicles which can be readily adjusted to convert it from dumping operation and movement to operation between load carrying and ramp forming positions, and vice versa.

A further object is to provide a device of this character wherein minimum manipulation and adjustment of parts is required to convert the unit from one type operation or usage to the other type operation or usage.

A further object is to provide a device of this character wherein only a single power operated unit with a single control is required and is so connected to the vehicle and the tilting bed as to be operative in all adjustments and designed types of operation of the tilting bed.

A further object is to provide a device of this character wherein folding brace means are utilized in conjunction with power operated actuating means and are so oriented to the vehicle and the tilting bed as to facilitate operation of the device in all adjustments thereof.

Other objects will be apparent from the following specification.

In the drawings:

FIG. 1 is a side elevational view of the tilting bed in transport or load carrying position on a vehicle.

FIG. 2 is a side elevational view of a vehicle with the tilting bed in dumping position.

FIG. 3 is a side elevational view of a vehicle with the tilting bed in inclined ramp forming loading position.

DESCRIPTION OF THE PREFERRED EMBODIMENT

Referring to the drawing, the numeral 10 designates a vehicle, here shown as a truck, having a frame 12, wheels 14 and a body 16. It will be understood, however, that the illustration of the vehicle as a truck is illustrative and not intended to be limiting, and that the vehicle may be of the trailer type or the semi-trailer type, or any other type of vehicle having a frame supported on wheels. The frame 12 includes two or more longitudinally extending laterally spaced rigid frame members 18 which may be of tubular character, or of any other cross sectional configuration. The frame members 18 are suitably interconnected to provide a rigid frame structure which is supported by suitable spring means and the like (not shown) connected to the axles which journal the wheels 14.

A dump bed 20 is supported upon the vehicle frame, being rigid in character and including a pair of parallel longitudinal laterally spaced rigid bed frame members 22 each positioned above a vehicle frame member 18 and substantially horizontal in the load carrying position of the device, as illustrated in FIG. 1. The rear portion of the dump bed projects rearwardly beyond the rear of the vehicle frame in the transport position of FIG. 1 with each of the bed frame members 22 positioned with clearance between a pair of rigid laterally spaced bracket members 24 which project upwardly from the rear of each vehicle frame member 18. Each pair of bracket members 24 journals a roller 26 below the adjacent bed frame member 22 and upon which a bed frame member 22 may be supported for longitudinal movement. At their upper portions and above the roller 26 bracket members 24 are provided aligned transverse apertures 28. The rear portion of each bed frame member has an aperture 30 therein adapted to register with apertures 28 of the brackets in the transport position of the vehicle bed illustrated in FIG. 1. Suitable pivot members or pins 32 are retractably or removably mounted to extend through each set of adjacent apertures 28 and 30 when the vehicle is in the adjustments and positions illustrated in FIGS. 1 and 2.

The dump bed will include suitable structural members (not shown) connecting the bed frame members and load supporting platform 34 or the like, such as the bottom panel of a load carrying box (not shown), said platform 34 or other load supporting member being fixedly secured to the bed frame member 22 and extending to the rear end thereof. The rear end of bed frame members 22 may be beveled, as seen at 36.

The front portion of the dump bed preferably is supported by the vehicle frame at supports 38 carried by vehicle frame members 18 when the bed is in transport position illustrated in FIG. 1.

The front of the dump bed 20 is connected to the vehicle frame 12 by folding support means 40 at each side thereof. Each folding support means 40 includes an elongated rigid arm 42 of L-shape characterized by an angularly extending part 44 at the end thereof which is lowermost in the dumping position illustrated in FIG. 2. The opposite end of each arm 42 is pivoted at 46 to a bed frame member 22. The end of the angularly extending part 44 of arm 42 is pivotally connected at 48 to the end of a rigid elongated arm 50 whose opposite end is pivoted at 52 to a vehicle frame member 18.

Power driven actuating means for elevating and lowering the dump bed preferably comprise a pair of similar double-acting hydraulic extensible members at opposite sides of the vehicle. Each actuating member includes a cylinder 54 within which is shiftable a piston (not shown) connected to an extensible and retractable piston rod 56 projecting from one end of the cylinder. The power members are interconnected for conjoint simultaneous similar operation by suitable control means (not shown). One end of each cylinder is pivoted at 58 to the adjacent vehicle frame member 18 coaxially of pivot 52 of arm 50. The free end of each piston rod is pivoted at 60 to the adjacent L-shaped arm 42 intermediate the pivot 46 and the arm part 44, spaced slightly from the latter, it being understood that the pivots 60 are positioned on the arms 42 so as to be coaxial.

Each of the vehicle frame members 18 has an aperture 62 therein, and each of the arms 50 has an aperture 64 therein, said apertures 62 and 64 being equally spaced from the pivot axis 52 of arm 50 and so positioned as to register when the bed is in the transport position illustrated in FIG. 1, so as to accommodate the reception of retractable interlocking pin means 66 which anchor the arms 50 to the vehicle frame.

The transport or load carrying position of the device is shown in FIG. 1, from which it will be seen that the arms 42 and 50 of the folding support assume substantially horizontal positions incident to the contraction of the hydraulic power members 54–56. In this position the bed is supported on the rollers 26 and the supports 38 in horizontal position, and apertures 28 of brackets 24 register with apertures 30 of the frame members 22 of the bed and apertures 62 of the truck frame members 18 register with apertures 64 of the arms 50 of the folding support members. In this position the user has the option of applying retractable pivot members 32 in the registering apertures 28–30, or of applying retractable pins 66 in the registering apertures 62 and 64. If pivot pins 32 are applied in the apertures 28 and 30 and pins 66 are released from apertures 62–64, subsequent operation of the hydraulic power means will cause the unit to operate as a dump unit in the manner illustrated in Fig. 2. Thus, as the power members 54–56 are extended from the FIG. 1 position, the arms 42 and 50 of the folding support means are extended toward vertical position. The range of movement or extension of the power members 54–56 extends from the retracted FIG. 1 position to the extended FIG. 2 position in which the folding support 40 is fully extended and the dump bed is pivoted about the pivot 32 to inclined dumping position. The angle of tilt of the bed 22 is determined by the amount of extension of the power members 54–56 up to a selected extent substantially as shown in FIG. 2. Retraction of the extensible power members 54–56 will return the bed to the FIG. 1 position.

When the user encounters a condition in which it is desired to rearwardly shift the dump bed to an inclined ramp forming position with the rear end of the dump bed contacting the ground to facilitate loading of the bed, the device can be adjusted while the bed is in the FIG. 1 position by inserting pins 66 in the registering apertures 62 and 64 removing the pins 32 from the apertures 28 and 30. This action frees the dump bed frame relative to the vehicle frame to accommodate fore and aft rolling thereof upon the rollers 26 incident to operation of the power members 54–56. The arms 50 are locked in fixed substantially horizontal position upon the vehicle frame 12 by the pins 66 so that operation of the power members 54–56 serves to swing the L-shaped arm 42 of the folding support about the pivot 48 which is then fixed relative to the truck frame. This action shifts the forward end of the dump bed upwardly and rearwardly to the position illustrated in FIG. 3, at which the rear beveled end 36 of the dump bed frame 22 contacts the ground so that the dump platform 34 becomes a ramp on which articles to be loaded or unloaded can be shifted or moved. Retraction of the power members 54–56 when the bed is in FIG. 3 position causes the folding arms 42 to swing clockwise as here viewed and thereby forwardly advances the dump bed upon the rollers 26 to the transport position illustrated in FIG. 1.

While the preferred embodiment of the invention has been illustrated, it will be understood that changes in the construction within the scope of the appended claims may be made without departing from the spirit of the invention.

What I claim is:

1. In combination,
 a vehicle having a frame,
 bracket means carried by the rear portions of the sides of said vehicle frame,
 a dump bed carried by said vehicle frame and including frame members juxtaposed to said bracket means,
 releasable means for pivoting said dump bed frame members to said bracket means,
 folding support means connecting the front of said dump bed to said vehicle frame and including pivotally connected upper and lower arms,
 power actuated extensible and contractible means pivoted at its opposite ends to said vehicle frame and to an intermediate portion of the upper arm of said folding support means, and
 releasable means for anchoring the lower arm of said folding support means to said vehicle frame, whereby
 said dump bed may be tilted about said pivot means upon operation of said power actuated means when said anchor means is released and said dump bed may be shifted bodily on said vehicle frame to and from inclined ramp forming position at the rear of said vehicle frame upon operation of said power actuated means when said anchor means locks said lower folding support arm to said vehicle frame and said pivot means is released.

2. The combination defined in claim 1, wherein said bracket means guide movement of said dump bed to and from ramp forming position.

3. The combination defined in claim 1, and roller means journaled by said bracket means and supporting said dump bed during movement to and from ramp forming position.

4. The combination defined in claim 1, wherein the upper arm of said folding support includes an angularly extending part to define an L-shape and said power actuated member is connected to said upper arm spaced from its bed-connected end and from said angularly extending arm part.

5. The combination defined in claim 1, wherein said power actuated member is pivoted to said vehicle frame substantially coaxially of the pivot of the lower arm of said folding support to said vehicle frame.

* * * * *